United States Patent [19]
Nakajima

[11] Patent Number: 5,743,703
[45] Date of Patent: Apr. 28, 1998

[54] WEB CARRYING APPARATUS

[75] Inventor: Kiyoji Nakajima, Higashikurume, Japan

[73] Assignee: Himecs Corp., Tokyo, Japan

[21] Appl. No.: 492,820

[22] Filed: Jun. 20, 1995

[51] Int. Cl.$^6$ .................... B66F 9/075; B65G 67/02
[52] U.S. Cl. .................... 414/590; 414/642; 414/672; 414/911
[58] Field of Search .................... 414/589, 590, 414/684, 639, 641, 642, 663, 665, 666, 672, 911, 471, 495

[56] References Cited

U.S. PATENT DOCUMENTS

| | | |
|---|---|---|
| 3,795,323 | 3/1974 | Ouska . |
| 4,718,813 | 1/1988 | Kehlenbach .................... 414/684 |
| 4,755,099 | 7/1988 | Belreal .................... 414/665 X |
| 5,274,984 | 1/1994 | Fukuda .................... 414/911 X |
| 5,297,915 | 3/1994 | Bach .................... 414/590 |
| 5,308,217 | 5/1994 | Pienta .................... 414/911 X |
| 5,451,133 | 9/1995 | Salsburg et al. .................... 414/911 X |
| 5,490,756 | 2/1996 | Reichert et al. .................... 414/911 X |

FOREIGN PATENT DOCUMENTS

| | | |
|---|---|---|
| 0 524 828 | 1/1993 | European Pat. Off. . |
| 2 685 911 | 7/1993 | France . |
| 2257684 | 1/1993 | United Kingdom .................... 414/911 |
| 2 276 864 | 10/1994 | United Kingdom . |

*Primary Examiner*—Stephen Gordon
*Attorney, Agent, or Firm*—Wenderoth, Lind & Ponack

[57] ABSTRACT

A rolled web carrying apparatus is used to enable easy and safe handling of a web. On a carrying truck is mounted a web receiver which faces the peripheral surface of the web and is vertically movable and rotatable around a bearing through a parallelogram link device. Further a fluid pressure cylinder is mounted as one side of the parallelogram link device, by which the web receiver can be tilted between a level position and a vertical position.

12 Claims, 4 Drawing Sheets

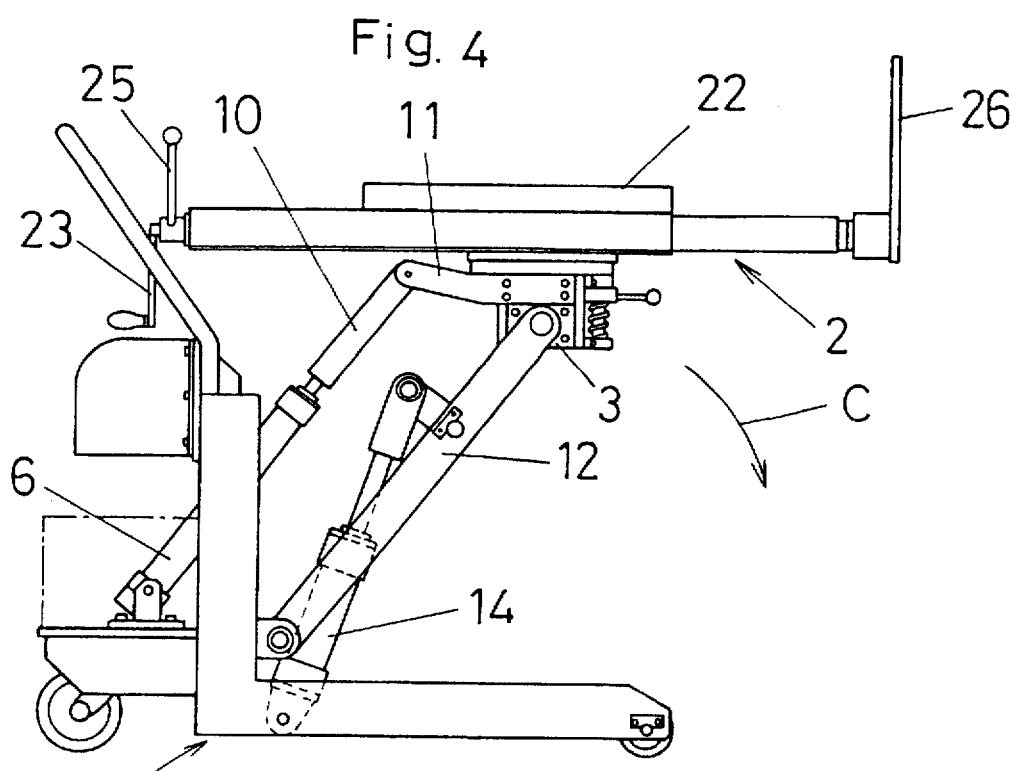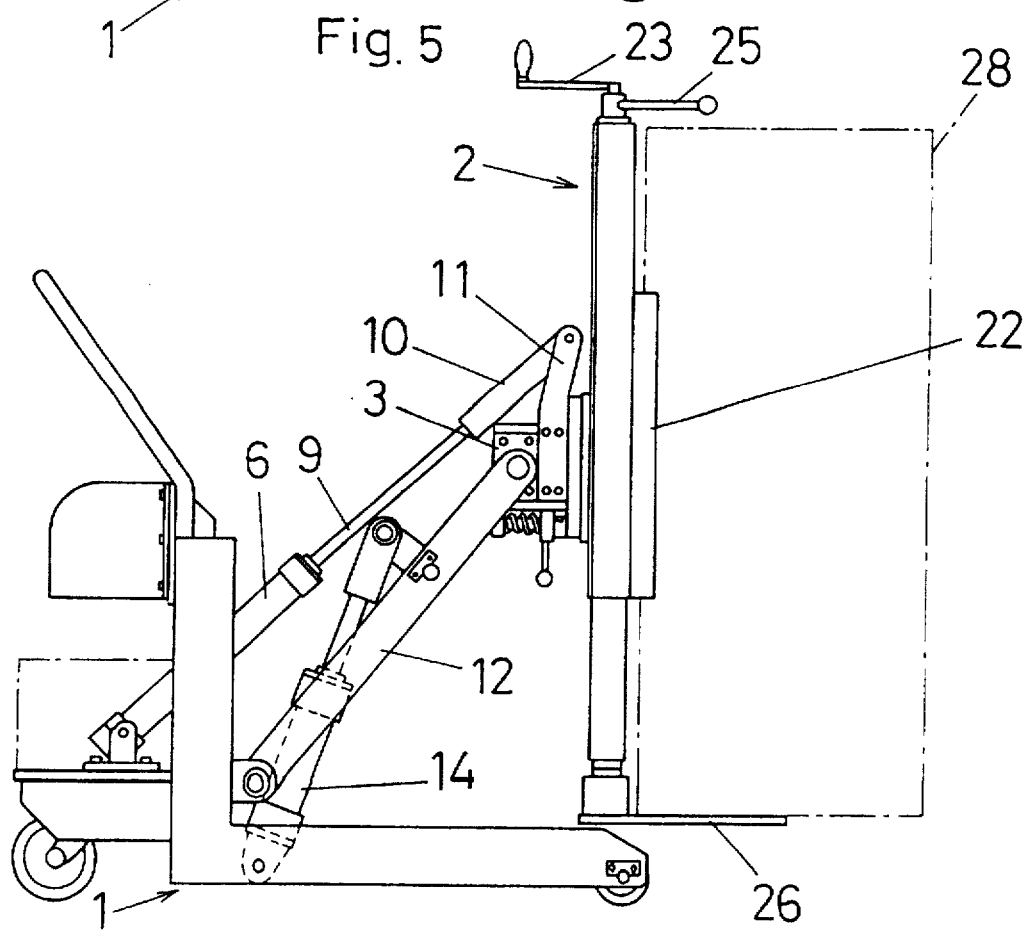

WEB CARRYING APPARATUS

BACKGROUND OF THE INVENTION

1. Field of the Invention

The present invention relates to an apparatus for carrying a web which is a rolled sheet of synthetic resin film, paper, film laminate paper, etc. wound on a winding shaft.

2. Description of the Prior Art

In the conventional manufacture or process (printing, etc.) of sheets such as synthetic resin film, paper, film laminate paper, and so forth, sheet winding by a winding machine, transport of a wound sheet (web) in another apparatus, and loading of the web to an unwinding machine are repetitively performed. All these operations are manually carried out.

The web is in most cases handled with the winding shaft set horizontally on the winding machine or on the unwinding machine, and is carried on a pallet with the winding shaft vertically erected during transport, because the web which is heavy will tend to undergo sheet deformation (compression) or damage of the surface thereof in contact with the pallet when loaded on the pallet with the winding shaft set horizontally.

SUMMARY OF THE INVENTION

According to conventional practices, web handling is all carried out manually as described above. The web, being very heavy, requires hard work in handling, which will be accompanied by a hazard.

In view of the above-described disadvantage, it is an object of the present invention to provide a web carrying apparatus which enables easy and safe handling of a web.

In order to accomplish the object, the web carrying apparatus of this invention features a web receiver which faces the peripheral surface of a web to be carried and mounted on a carrying truck so as to be able to move vertically and rotate. A tilting mechanism is provided for the inclining the web receiver between a level position and a vertical position.

The tilting mechanism is a parallelogram link device having a fluid-pressure cylinder (hydraulic or pneumatic pressure cylinder) on one side, and is constituted by connecting a carrying truck and a web receiver. Furthermore, a fluid pressure cylinder for moving the web receiver up and down (vertically) may be provided between one side of the parallelogram link device and the carrying truck.

The web receiver is extendible to correspond to the width of the web. A pair of rotating shafts is provided in parallel, and a receiving plate is fixedly installed on the end portion of the rotating shaft opposite to the end face of the web, so that the web can be set in a vertical position. Furthermore, a contact sensor may be mounted within the plane opposite to the peripheral surface of the web on the web receiver.

Using the web carrying apparatus of the present invention enables the receiving of a web on the web receiver, the upward and downward (vertical) movement of the web in a level state via the web receiver, and the changing of a supporting position between the level position and the vertical position. It is also possible to carry the web on the carrying truck to a desired place.

According to the present invention, as explained above, the web carrying apparatus comprises the web receiver which can move vertically and rotate and the tilting mechanism for changing the supporting position of the web receiver between the level position and the vertical position, so that a heavy web may be handled easily and safely by the web carrying apparatus of the present invention.

The foregoing object and other objects and advantages will become more apparent and understandable from the following detailed description thereof, when read in connecting with the accompanying drawings.

BRIEF DESCRIPTION OF THE DRAWINGS

FIG. 4 is a front view of an embodiment of the present invention showing the web receiver in a turned and raised position;

FIG. 5 is a front view of an embodiment of the present invention showing the web receiver of FIG. 4 in a vertical position from the level position of FIG. 4;

DETAILED DESCRIPTION OF THE PREFERRED EMBODIMENT

A web carrying apparatus of the present invention will hereinafter be described in accordance with the preferred embodiment.

Figure 1:
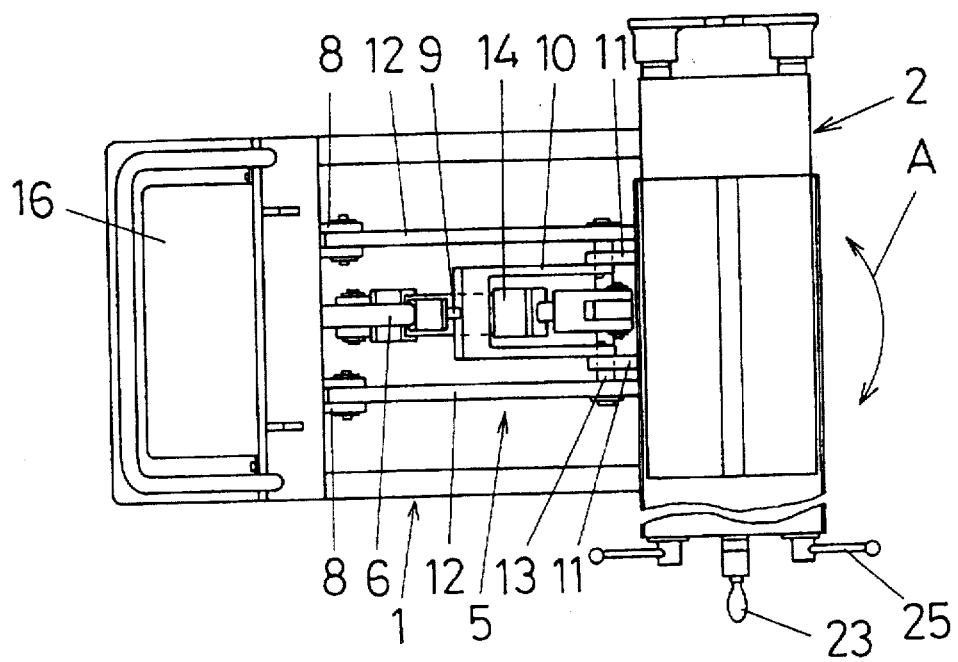
FIG. 1 is a plan view of an embodiment of the present invention.

As shown in FIG. 1, a web receiver 2 is mounted on a carrying truck 1 in such a manner that it can turn in a direction of the arrow A through a bearing 3. The bearing 3 is vertically movably supported on the carrying truck 1 through a parallelogram link device 5.

The parallelogram link device 5 is composed of a hydraulic cylinder 6 on one side of the parallelogram; brackets 7, 8, 8 are attached on the carrying truck 1. The base end of the hydraulic cylinder 6 is rotatably connected to the bracket 7, and the forward end of a U-shaped short link 10 connected to a piston shaft 9 of the hydraulic cylinder 6 is rotatably connected to an arm 11 protruding to the side of the bearing 3; and furthermore the base ends of long link pieces 12, 12 are rotatably connected to the other brackets, 8, 8, and the forward ends of the link pieces 12, 12 are also rotatably connected to both sides of the lower part of the bearing 3.

Figure 2:
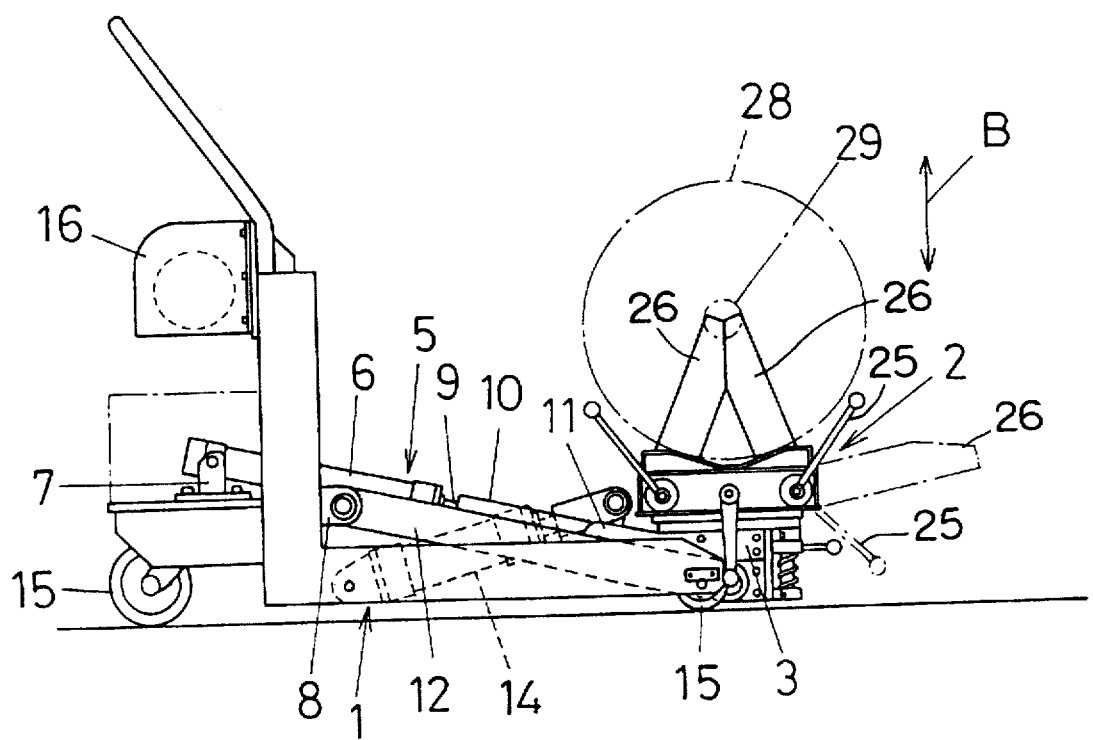
FIG. 2 is a front view of FIG. 1.
Figure 3:
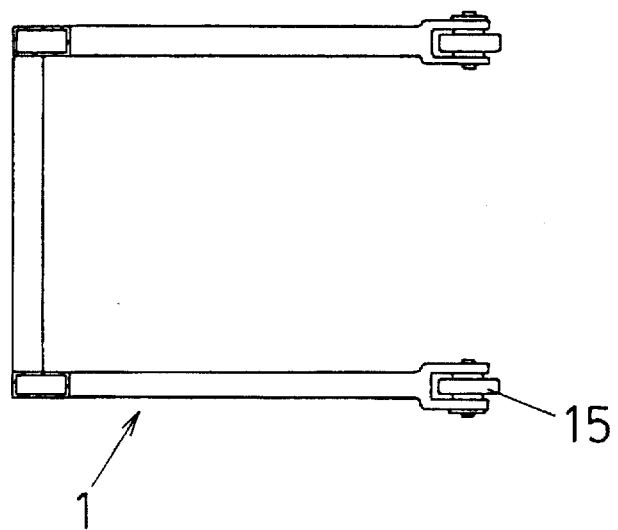
FIG. 3 is a partly cross sectional view of a carrying truck of the present embodiment.

A connecting pin 13 is mounted on the intermediate sections of the long link pieces 12, 12. Another hydraulic cylinder 14 is obliquely mounted between the connecting pin 13 and the carrying truck 1. The hydraulic cylinder 11 is used for moving the web receiver 2 up and down as indicated by the arrow B (FIG. 2). FIG. 3 shows a part (the frame section) of the carrying truck 1. In FIGS. 1, 2 and 3, numeral 15 denotes a wheel and numeral 16 represents a hydraulic unit.

The parallelogram link device 5 is for tilting the web receiver 2 between the level position as shown in FIG. 4 and the vertical position as shown in FIG. 5. In this case, before the tilting between the level position and the vertical position, the web receiver 2 has been turned through 90 degrees from the position shown in FIG. 1 to the position shown in FIG. 4. That is, the total length of the hydraulic cylinder 6 and the short link piece 10 will become equal to the length of the long link piece 12 when the piston shaft 9 of the hydraulic cylinder 6 is in a contracted position, so that the parallelogram relationship may be formed and the web can be moved in a parallel manner in a level position any time when the web receiver 2 is moved up and down by and through the hydraulic cylinder 14.

When the piston shaft 9 of the hydraulic cylinder 6 is extended, the aforesaid parallelogram relationship is destroyed, and the web receiver 2 turns to the vertical position as indicated by the arrow C (FIG. 4) on the center of the connection part between the long link piece 12 and the bearing 3.

Figure 6:
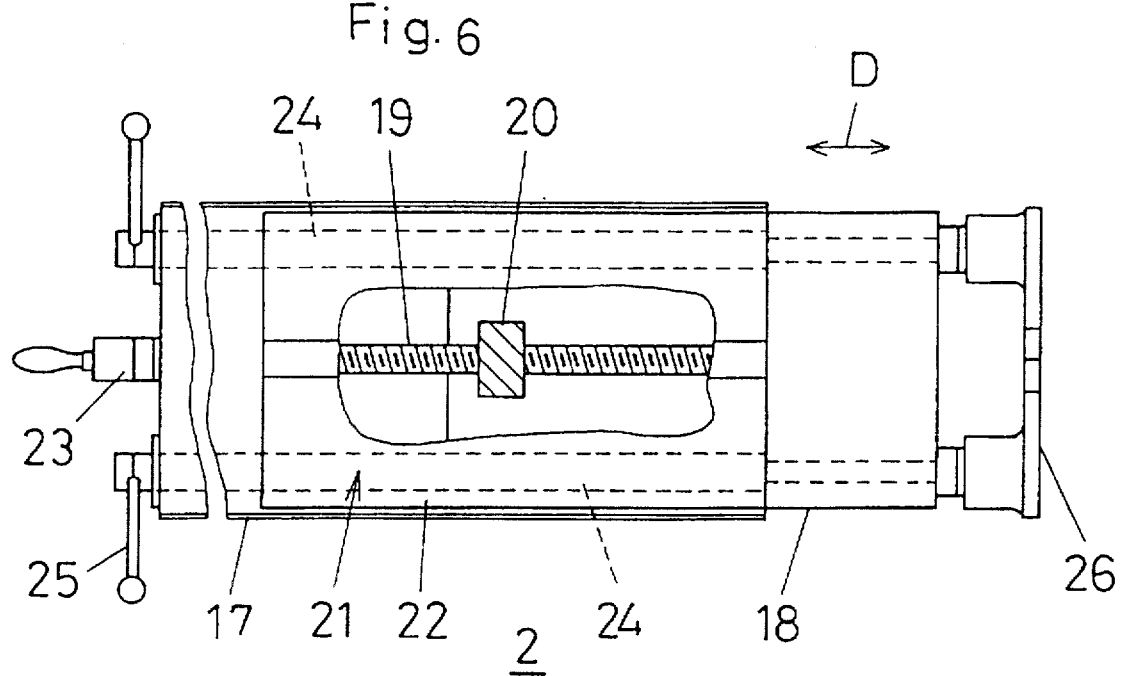
FIG. 6 is a schematic plan view of the web receiver of the present embodiment.

The web receiver 2, as shown in FIG. 6, is extendible in a longitudinal direction. A box-like sliding body 18 is inserted on the forward end side (on the right side in FIG. 6) of the box-like receiver body 17 with the shaft supported on the bearing 3 mounted on the undersurface. A screw shaft 19 mounted along the longitudinal direction at the center of the receiver body 17 is threadedly engaged with a nut 20 mounted on the sliding body 18, and a receiving member 22 with its upper surface 21 depressed into a valley formation is mounted on the upper side of the receiver body 17 and nearby the forward end side of the receiver body 17. On the base end of the screw shaft 19 is secured a handle 23. When the screw shaft 19 is turned by the handle 23, the sliding body 18 moves in the direction of the arrow D (FIG. 6), thereby extending or contracting the web receiver 2.

Rotating shafts 24, 24 are inserted along both sides of the receiver body 17 and the sliding body 18 which constitute the web receiver 2. Each of the rotating shafts 24 is an extensible shaft comprising a rod body 24a and a tubular body 24b which are connected by splines 24c with each other so that the rotating shaft 24 can operate in accordance with the movement of the sliding body 18. On the base end (the handle 23 side) of the rotating shaft 24 is secured a rotating lever 25; and on the forward end each of the rotating shaft 24 is secured a receiving plate 26. Due to the presence of the splines 24c to interconnect the rod body 24a with the tubular body 24b for rotation with one another, rotation of the rotating lever from the solid line position of FIG. 2 to the phantom line position of FIG. 2 will cause the receiving plate 26 to rotate from the solid line position of FIG. 2 to the phantom line position of FIG. 2.

Figure 7:
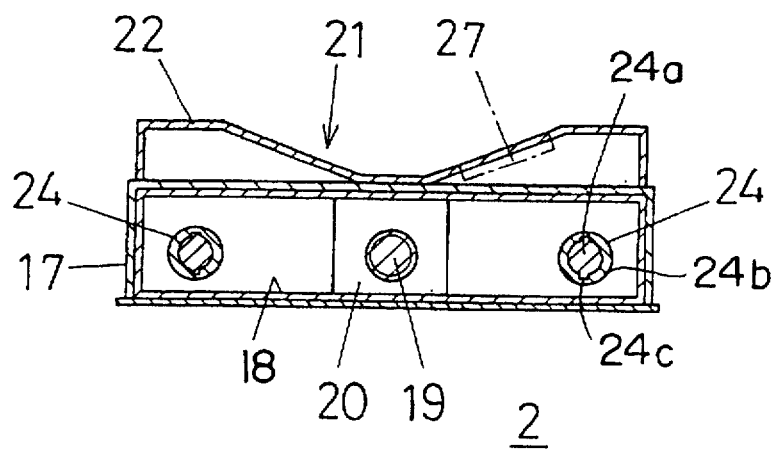
FIG. 7 is a schematic sectional view of the web receiver of FIG. 6.

A contact sensor 27 is mounted on the upper surface 21 of the receiving member 22. The contact sensor 27 includes a pressure switch, etc. which faces the peripheral surface of the web, and it is mounted on the surface 21 in a direction perpendicular to the longitudinal direction as shown in FIG. 7.

The operation of the present embodiment will hereinafter be explained.

First, the carrying apparatus in the state shown in FIG. 1 is moved downwards of a web 28 on a winding machine, where the web receiver 2 faces the web 28. Next, the web receiver 2 is raised by and through the hydraulic cylinder 14. An output signal of the contact sensor 27 is fed to the driving circuit of the hydraulic cylinder 14 so that the upward movement of the web receiver 2 will stop when the upper surface 21 of the receiving member 22 of the web receiver 2 contacts the peripheral surface of the web 28, thus ensuring safe operation. The upper surface 21 of the receiving member 22 of the web receiver 2 is depressed into a valley formation and the web receiver 2 is rotatable as indicated by the arrow A (FIG. 1), thereby automatically maintaining the web 28 in parallel with the web receiver 2.

Subsequently, with the web 28 loaded on the web receiver 2, a winding shaft 29 of the winding machine is released from the web 28, and then the web 28 is carried to a desired place, for example to the side of a carrying pallet by moving the carrying apparatus.

After the carrying apparatus is moved to the other place, the web receiver 2 is turned through 90 degrees in the direction of the arrow A (FIG. 1) to the position as shown in FIG. 4. Then the handle 23 is turned to adjust the length of the web receiver 2 to the width of the web 28, and also the turning lever 25 is operated to move the receiving plate 26 into contact with the end face of the web 28.

Next, the piston shaft 9 of the hydraulic cylinder 6 is extended to tilt the web 28 from the level position shown in FIG. 4 to the vertical position shown in FIG. 5 and then the web is supported by the receiving plate 26.

The lower end face (the face supported by the receiving plate 26) of the web 28 in the vertical position is nearly as high as the upper surface of the carrying pellet, so that the web 28 may be unloaded onto the pallet by turning the receiving plate 26 by outwardly turning the lever 25.

The web 28 can be handled without impairing the web sheet by unloading the web 28 onto the pallet as described above and carrying the web 28 on the pallet. Furthermore, even in the case of a loosely wound web, a multi-layered sheet portion can be prevented from telescoping.

The web vertically supported on the pallet can be loaded onto the unwinding machine by reversing the procedure described above. It is also possible to carry the web without using the pallet, the web 28 as loaded on the web receiver 2 can be carried on the carrying truck 1 to a desired place such as the unwinding machine.

What is claimed is:

1. A web carrying apparatus for use in carrying a rolled web having an outer peripheral surface and axially opposing end surfaces, said web carrying apparatus comprising:
    a carrying device;
    a bearing mounted on said carrying device;
    a web receiver rotatably mounted to said bearing for rotation about a vertical axis between a web receiving position and a web lifting position;
    a link mechanism pivotally coupling said bearing to said carrying device for pivotal movement of said bearing between a horizontal position, in which said bearing and said web receiver are positioned horizontally to support the web in an axially horizontal orientation, and a vertical position in which said bearing and said web receiver are positioned vertically to support the web in an axially vertical orientation;
    a first fluid cylinder having first and second ends, said first end of said first fluid cylinder being rotatably connected to said bearing, and said second end of said first fluid cylinder being connected to said carrying device; and
    a second fluid cylinder having first and second ends, said first end of said second fluid cylinder being rotatably connected to an intermediate section of said link mechanism, and said second end of said second fluid cylinder being rotatably connected to said carrying device.

2. A web carrying apparatus as recited in claim 1, wherein said link mechanism, said first fluid cylinder and said second fluid cylinder together constitute a means for lifting said web receiver from a horizontal position to a raised position above said horizontal position of said web receiver while maintaining said web receiver, as well as the web when supported on said web receiver, in a horizontal orientation.

3. A web carrying apparatus as recited in claim 2, wherein said web receiver includes a web receiving member configured to support the web by the other peripheral surface thereof.

4. A web carrying apparatus as recited in claim 1, wherein said web receiver includes a web receiving member configured to support the web by the outer peripheral surface thereof.

5. A web carrying apparatus as recited in claim 1, wherein said web receiver comprises:

an elongated receiver body having a first surface constituting an upper surface when said web receiver is in a horizontal position, and a second surface constituting a lower surface when said web receiver is in said horizontal position;

a receiving member mounted on said first surface of said receiver body;

a sliding body longitudinally slidably mounted to said elongated receiver body;

a screw shaft mounted to and extending longitudinally along said elongated receiver body;

a screw shaft handle secured to one end of said screw shaft; and a nut fixed to said sliding body and threadably mounted to said screw shaft for movement therealong.

6. A web carrying apparatus as recited in claim 5, wherein said web receiver further comprises:

a pair of rotary shafts rotatably mounted longitudinally along said elongated receiver body, each of said rotary shafts comprising a rod body and a tubular body, said tubular body being telescopically mounted on said rod body for longitudinal sliding relative thereto and fixed for rotation with said rod body;

a pair of rotating handles secured to first ends of said rotary shafts, respectively; and a pair of receiving plates secured to second ends of said rotary shafts, respectively, such that, upon rotation of said rotating handles, said rotary shafts and said receiving plates rotate, respectively.

7. A web carrying apparatus as recited in claim 6, further comprising a contact sensor mounted on said web receiver in a position so as to confront the outer periphery of the web when the web is supported on said web receiver.

8. A web carrying apparatus as recited in claim 1, further comprising a contact sensor mounted on said web receiver in a position so as to confront the outer periphery of the web when the web is supported on said web receiver.

9. A web carrying apparatus as recited in claim 1, wherein said carrying device comprises a carrying truck.

10. A web carrying apparatus for use in carrying a rolled web having an outer peripheral surface and axially opposing end surfaces, said web carrying apparatus comprising a carrying device;

a web receiver movably mounted to said carrying device for movement between a horizontal web receiving position in which said web receiver is operable to support the web by the outer peripheral surface thereof in a first axially horizontal orientation, a horizontal web lifting position in which said web receiver is operable to support the web by the outer peripheral surface thereof in a second axially horizontal orientation angularly offset from the first axially horizontal orientation, a horizontal web lifted position, spaced above said horizontal web lifting position, in which said web receiver is operable to support the web by the outer peripheral surface thereof in said second axially horizontal orientation, and a vertical position in which said web receiver is operable to support the web by one of the axially opposing end surfaces thereof in an axially vertical orientation;

means for rotating said web receiver between said horizontal web receiving position and said horizontal web lifting position;

means for moving said web receiver between said horizontal web lifting position and said horizontal web lifted position;

means for pivoting said web receiver between said horizontal web lifted position and said vertical position;

wherein said moving means and said pivoting means are together comprised by a link mechanism including:

a first link having a first end pivotally connected to said web receiver, and a second end pivotally connected to said carrying device;

a second link having a first end pivotally connected to said web receiver, and a second end pivotally connected to said carrying device; and a fluid cylinder having a first end pivotally connected to an intermediate section of said first link and a second end pivotally connected to said carrying device.

11. A web carrying apparatus as recited in claim 10, wherein said second link comprises a fluid cylinder.

12. A web carrying apparatus for use in carrying a rolled web having an outer peripheral surface and axially opposing end surfaces, said web carrying apparatus comprising:

a carrying device;

a web receiver movably mounted to said carrying device for movement between a horizontal web receiving position in which said web receiver is operable to support the web by the outer peripheral surface thereof in a first axially horizontal orientation, a horizontal web lifting position in which said web receiver is operable to support the web by the outer peripheral surface thereof in a second axially horizontal orientation angularly offset from the first axially horizontal orientation, a horizontal web lifted position, spaced above said horizontal web lifting position, in which said web receiver is operable to support the web by the outer peripheral surface thereof in said second axially horizontal orientation, and a vertical position in which said web receiver is operable to support the web by one of the axially opposing end surfaces thereof in an axially vertical orientation;

means for rotating said web receiver between said horizontal web receiving position and said horizontal web lifting position;

means for moving said web receiver between said horizontal web lifting position and said horizontal web lifted position;

means for pivoting said web receiver between said horizontal web lifted position and said vertical position;

wherein said web receiver comprises a receiver body and a sliding body slidably mounted to said receiver body, and means for longitudinally sliding said sliding body relative to said receiver body for longitudinally elongating and shortening said web receiver; and wherein said web receiver further comprises a pair of longitudinally disposed rotary shafts, each of said rotary shafts including a rod body and a tubular body, said tubular body being axially slidable relative to said rod body and fixed for rotation relative to said rod body, a pair of receiving plates secured to first ends of said rotary shafts, respectively, and a pair of rotating levers secured to second ends of said rotary shafts, respectively, for rotating said receiving plates, respectively.

* * * * *